July 14, 1959　　　　L. CRANBERG　　　　2,895,051
APPARATUS FOR MEASURING NEUTRON CROSS SECTIONS
Filed Feb. 4, 1957

WITNESSES:

INVENTOR.
Lawrence Cranberg
BY

United States Patent Office 2,895,051
Patented July 14, 1959

2,895,051

APPARATUS FOR MEASURING NEUTRON CROSS SECTIONS

Lawrence Cranberg, Los Alamos, N. Mex., assignor to the United States of America as represented by the United States Atomic Energy Commission Application February 4, 1957, Serial No. 638,186

3 Claims. (Cl. 250—83.3)

This invention relates to apparatus utilized in combination with particle accelerators for analyzing the nuclear reaction products resulting from impingement of the particles against a selected target material and separately recording, in a multi-channel analyzer, the reactions in accordance with the corresponding energies of the impinging particles.

Utilization of materials in nuclear devices such as reactors requires that behavior, i.e., cross section of the active materials, be definitely established and known.

In the utilization of the prior art apparatus the operator adjusts the potentials on the electrodes of the particle accelerator tube in order to obtain a selected energy of interest for the impinging particles against the target. Obtaining an analysis of the reaction products of a target material over a range of energies of impinging particles, involved systematic resetting of the potentials on the accelerator tube electrodes over a large range of values and taking data for each setting. Such a procedure is obviously exceedingly tedious and time consuming.

The present invention provides for the taking of data over any selected range of energies of the impinging particles in a completely automatic fashion. The target of the accelerator tube is insulated from ground and a cyclicly varying target modulating potential is impressed between the target and a grounded shield tube surrounding the end portion of the particle beam path. The output of a nuclear reaction detector is fed into a discriminator pulse height which, in response to each pulse from the nuclear reaction detector, produces a substantially rectangular output pulse of fixed amplitude and duration. The output of the discriminator and a small fraction or sample of the target modulator potential are fed into a hereinafter termed function sampler, which produces an output pulse having an amplitude proportional to the instantaneous accelerating potential on the target at the time the discriminator output pulse was produced. The output pulses from the function sampler are fed into a multi-channel analyzer which segregates and records the pulses in accordance with amplitude.

The invention will be more completely understood from the following description taken with the drawings made a part of this specification.

Figure 2:
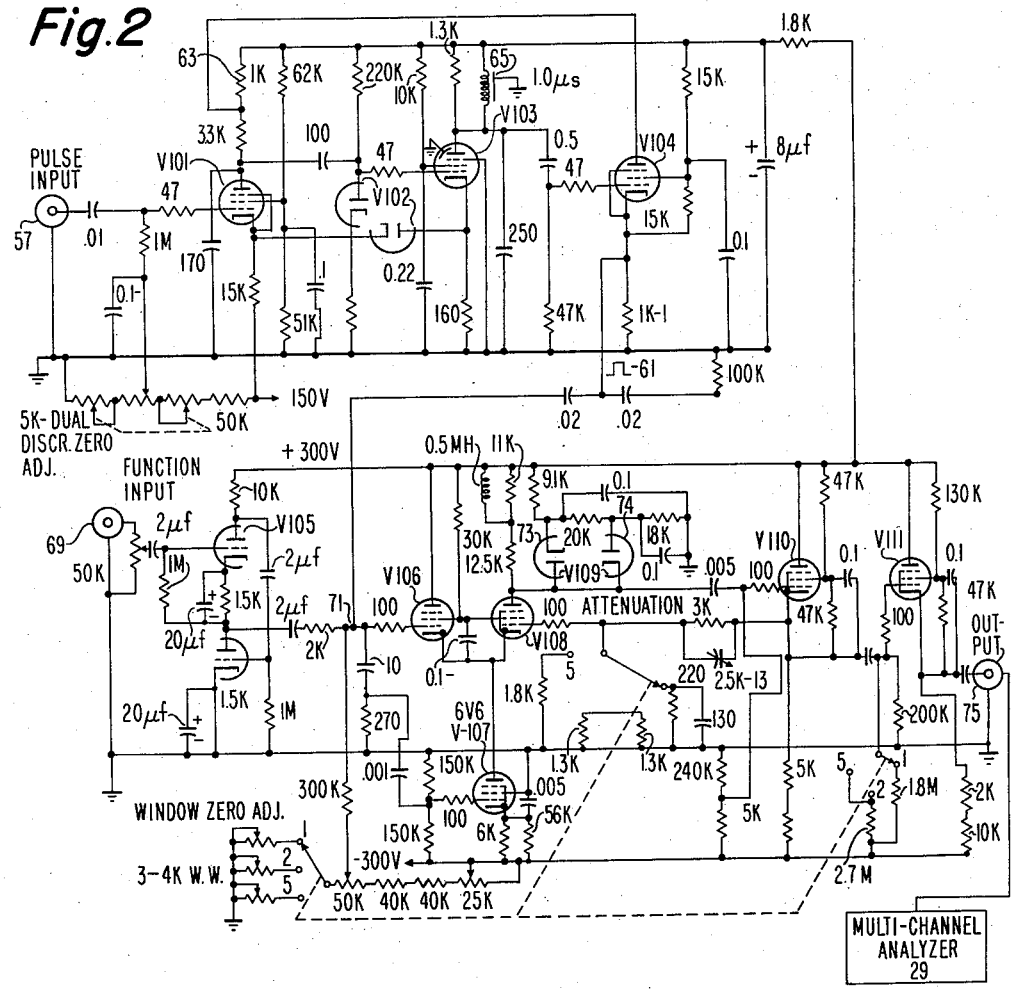
Figure 1:
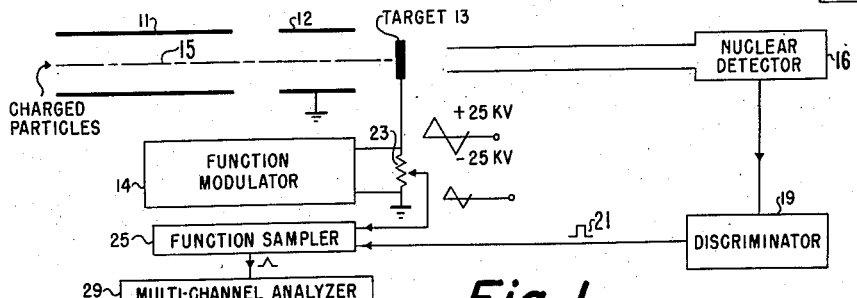

In the drawings, Figure 1 is a block diagram of the apparatus and system of this invention and Figure 2 is a schematic diagram of the discriminator and function sampler components of Figure 1.

The overall operation of the system of the present invention is described with reference to Figure 1. The accelerator tube is schematically shown at 11 having a grounded end tube 12 and an insulated target 13 situated on the beam path 15. The high potential modulator 14 hereinafter termed the function modulator, is connected between the grounded tube and the target. The waveform of the modulator may have any amplitude or shape most convenient for any particular purpose, but in this preferred embodiment it is triangular with an amplitude of from minus 25 kilovolts to plus 25 kilovolts, and a frequency of 10 cycles per second.

A nuclear reaction detector 16 produces a pulse in response to each reaction product from the target. This pulse is fed into discriminator 19 which produces an output pulse of fixed amplitude and duration as shown at 21. A small fraction of the modulator function is obtained from voltage divider 23 and is fed together with the discriminator output pulse into function sampler 25. The function sampler 25 produces an output pulse in response to each coincidence between the discriminator output pulse and the modulator wave-form function having an amplitude proportional to the instantaneous modulator potential. The function sampler output pulses are fed into multi-channel analyzer 29.

The circuitry of the discriminator 19 and function sampler 25, the details of which are not considered part of this invention, is shown in Figure 2. The output of the nuclear detector 16 is fed into terminal 57. A pulse height discriminator, not considered a part of this invention, is provided comprising tubes V-101, V-102, V-103 and V-104. Positive input pulses which override the selected bias on tube V-101 are shaped by the discriminator to provide an output pulse 61 which has a fixed amplitude and duration regardless of the amplitude of the input pulse. Tubes V-101, V-103, V-104 constitute a three tube regenerative feed-back loop with the regeneration provided by 1,000 ohm plate resistor 63 which is common to tubes V-101 and V-104. A short circuited delay line 65 in the plate circuit of tube V-103 and the direct current bias of tube V-104 provide the constant width output pulses. The output pulse may have an amplitude and duration of magnitude convenient to any particular situation, but in the present embodiment were selected to be of 2 microseconds and 10 volts respectively.

The function sampler comprises tubes V-105 and V-111. The function potential is impressed on input terminal 69 and is coupled into linear cathode follower 105. The outputs of the cathode follower and the discriminator are coupled together and mixed at connection 71 in the input circuitry of tube V-106. Tube V-106 is adjustably biased in order that the operator may select a range of pulses of interest. In any case, V-106 is biased well below cut-off so that only those pulses which override the bias are amplified. Tubes V-106 and V-108 comprise cathode coupled pentodes with negative feed-back applied to the grid of V-108 by means of cathode follower V-110. Tube V-107 is provided as a constant current source in the common cathode circuit of tubes V-106 and V-108 in a manner now well known in the art. V-109 provides two diodes 73 and 74 to limit the maximum amplitude of the output pulses. The output of the cathode coupled pentodes V-106 and V-108 is coupled into cathode follower V-110 which in turn is coupled into input of buffer tube V-111. The output of the discriminator and function sampler is provided at the cathode of tube V-111 at terminal 75. This output is fed into the 100 channel multiplier analyzer 29.

This apparatus, in addition to the above described use, is particularly adaptable to facilitate mass spectrometry analysis of materials. The energization of the analysis magnet can be varied in an automatic fashion and the count of "passed" ions for each energization can be automatically sorted and counted in a manner apparent to those skilled in the art.

The foregoing is a description of a preferred embodiment of a nuclear reaction analyzer but it is obvious that the spirit of the invention admits of other embodiments. Accordingly, it is understood that the invention is considered to be limited only by the appended claims taken in view of the prior art.

What is claimed is:
1. Apparatus for measuring the nuclear cross sections of materials comprising a nuclear reaction target, means for impinging a particle beam against said target, a nuclear reaction detector spacedly supported in the path of the reaction products from said target, a multi-channel analyzer, means for cyclicly varying the magnitude of a continuous target potential over a neutron producing range, a function sampler having first and second inputs respectively coupled to said means for modulating said target potential and to said nuclear reaction detector for generating a pulse in response to each detected event having an amplitude proportional to the amplitude of the instantaneous target potential, means electrically coupling the output of said function sampler to the input of said multichannel analyzer, whereby nuclear reactions are recorded in appropriate channels of said pulse height analyzer in correspondence with the magnitude of the responsible target potential.

2. The device of claim 1 in which said means for varying the target potential is a low frequency high voltage oscillator.

3. The device of claim 2 in which said low frequency high voltage oscillator produces a saw-tooth wave form.

References Cited in the file of this patent

UNITED STATES PATENTS

| 2,699,503 | Lyons et al. | Jan. 11, 1955 |
| 2,802,951 | Seevers | Aug. 13, 1957 |

FOREIGN PATENTS

| 724,441 | Great Britain | Feb. 23, 1955 |